(12) United States Patent
Decker

(10) Patent No.: US 7,287,960 B2
(45) Date of Patent: Oct. 30, 2007

(54) TITANIUM ALUMINIDE WHEEL AND STEEL SHAFT CONNECTION THERETO

(75) Inventor: David M. Decker, Arden, NC (US)

(73) Assignee: BorgWarner, Inc., Auburn Hills, MI (US)

( * ) Notice: Subject to any disclaimer, the term of this patent is extended or adjusted under 35 U.S.C. 154(b) by 477 days.

(21) Appl. No.: 10/900,645

(22) Filed: Jul. 28, 2004

(65) Prior Publication Data

US 2006/0021221 A1   Feb. 2, 2006

(51) Int. Cl.
*F01D 5/04* (2006.01)
(52) U.S. Cl. .............................. 416/213 R; 416/244 A
(58) Field of Classification Search ............ 416/244 A, 416/2, 213 R
See application file for complete search history.

(56) References Cited

U.S. PATENT DOCUMENTS

| | | | |
|---|---|---|---|
| 3,666,302 A | * | 5/1972 | Kellett .................... 416/213 R |
| 4,778,345 A | * | 10/1988 | Ito et al. ................. 416/241 B |
| 6,007,301 A | * | 12/1999 | Noda et al. ............. 416/213 R |

FOREIGN PATENT DOCUMENTS

| | | | | |
|---|---|---|---|---|
| JP | 57093606 A | * | 6/1982 |
| JP | 02124780 A | * | 5/1990 |
| JP | 02149477 A | * | 6/1990 |
| JP | 03054174 A | * | 3/1991 |

\* cited by examiner

*Primary Examiner*—Richard A. Edgar
(74) *Attorney, Agent, or Firm*—Stephan A. Pendorf; Akerman Senterfitt

(57) ABSTRACT

Titanium aluminide (TiAl) rotor shaft assembly (10) of a type used in a turbocharger has a TiAl rotor (20) with an axially protruded portion (40) that is fixedly joined to a recessed portion (50) of a metal shaft (30) by the synergistic combination of an interference fit, such as a heat shrinkage fit, further supported by a brazed joint (60) in which a thin layer of a brazing material (110) is interposed between the surface of the protruded portion (120) and the recessed surface (130). Optionally, one or both of the jointed surfaces have braze channels (90) to facilitate braze flow within the joint. Methods for producing the rotor shaft assembly (10) and a turbocharger having the rotor shaft assembly (10) are provided.

15 Claims, 1 Drawing Sheet

TITANIUM ALUMINIDE WHEEL AND STEEL SHAFT CONNECTION THERETO

FIELD OF THE INVENTION

The invention relates to a rotor shaft assembly of a type used in an exhaust driven turbocharger to drive a compressor and provide compressed air to an internal combustion engine, and to a method for the manufacture of the rotor shaft assembly. In further detail, the invention relates to a rotor shaft assembly wherein a titanium aluminide wheel has an axial projection and is joined with a rotatable steel shaft having an axial recess engaging the projection.

DESCRIPTION OF THE RELATED ART

Turbochargers are widely used in internal combustion engines to increase engine power and efficiency, particularly in the large diesel engines of highway trucks and marine engines. Recently, turbochargers have become increasingly popular for use in smaller, passenger car engines. The use of a turbocharger permits selection of a power plant that develops a required number of horsepower from a lighter engine. The use of a lighter engine has the desirable effect of decreasing the mass of the car, thus enhancing fuel economy and increasing sports performance.

Turbochargers generally comprise a turbine housing that directs exhaust gases from an exhaust inlet to an exhaust outlet across a turbine rotor. The turbine rotor or wheel drives a shaft, which is journaled in a bearing housing section. A compressor rotor is driven on the other end of the shaft, which provides pressurized gas to the engine inlet.

The general design and function of turbochargers are described in detail in the prior art, for example, in U.S. Pat. Nos. 4,705,463; 5,399,064; and 6,164,931.

To improve the heat resistance of the turbocharger, and to enhance engine responsiveness to changing operating conditions by lowering the inertia of the turbine rotor, ceramic turbine rotors made of silicon nitride are known. However, ceramic turbine rotors have the drawback that the rotors must be thicker than those of conventional metal rotors because of the lower toughness of ceramics. Also, balancing the thermal expansion of the ceramic rotor and its metal casing to maintain required clearances is difficult because of the much lower thermal expansivity of ceramics.

Therefore, titanium aluminide (TiAl) is preferred to ceramic as a material for the manufacture of turbine rotors or wheels because of its low specific gravity (approximately 3.8); high specific strength (strength by density) at high temperatures, which is equal to or better than that of Inconel 713; and its thermal expansion coefficient, which is similar to that of other metals. For these and other reasons, TiAl is now known in the art for the manufacture of turbine rotors (see e.g. Japanese Patent Disclosure No. 61-229901, and U.S. Pat. Nos. 6,007,301; 5,064,112; 6,291,086; and 5,314,106). More complex titanium alloys are also known for use in turbine rotors, including alloys comprising a TiAl intermetallic compound as the main component and other non-titanium elements in lower amounts. In the following description, all such alloys are generically referred to as TiAl.

In the manufacture of a turbine rotor assembly for use in, for example, a turbocharger, a TiAl turbine rotor is bonded to a rotatable shaft that is typically made of a structural steel. In the following disclosure the terms turbine rotor and turbine wheel are equivalent.

Achieving a suitably strong joint between a TiAl rotor or wheel and a steel shaft has proved difficult, which has limited the use of TiAl rotors in production because of the additional expense and steps required to achieve a strong joint and to balance the final rotor assembly. Direct friction welding is ineffective for mounting a TiAl rotor or wheel to a steel shaft because the structural steel is transformed from austenite to martensite upon cooling, which causes a volume expansion of the steel producing high residual stresses at the joint. Despite the high rigidity of TiAl, its ductility at room temperature is low (about 1%), and TiAl rotors readily crack due to residual stresses. This difficulty is compounded by the large difference between the melting points of most steels and TiAl, and the markedly different metallurgy of the two alloys. A further problem is that during heating and cooling titanium may react with carbon in the steel to form titanium carbide at the jointing surface thereby weakening the joint.

Securely joining a TiAl rotor to a steel shaft, or to any metallic shaft is also difficult because the joint must be able to withstand the severe elevated and fluctuating temperatures that occur within an operating turbocharger. In addition, the joint must withstand circumferential loads due to the transmission of fluctuating torques. It has therefore proved difficult to provide a particularly positive, intimate joint to connect a TiAl rotor to a steel shaft without an intermediate material of different composition.

It is known to interpose an austenitic material that does not suffer from martensitic transformation to join a TiAl rotor and a steel shaft. A first joint, typically a weld, is required between the interposed material and the turbine rotor, and a second joint, also typically a weld, is required to attach the rotor to the shaft via the interposed material. These extra steps add time and expense to the manufacture of a turbine rotor assembly. Furthermore, controlling the final thickness of the interposed material is difficult, and the final rotor shaft assembly must often be extensively machined to achieve balance.

As a first example, U.S. Pat. No. 5,431,752 to Brogle et al. discloses the use of a nickel alloy piece interposed between a γ-TiAl rotor and a steel shaft, in which the interposed piece is sequentially joined to the shaft and rotor by friction welding.

In a second example, U.S. Pat. No. 5,064,112 to Isobe et al. discloses the use of an austenitic stainless steel, or a Ni-based or Co-based superalloy, interposed between a structural steel and a TiAl member and friction welded to both.

In a third and fourth example, U.S. Pat. No. 6,291,086 to Nguyen-Dinh disloses the an intermediate iron-based interlayer having a specific composition adapted to join steel and TiAl members by friction welding, and U.S. Pat. No. 5,314,106 to Ambroziak et al. teaches two intermediate interlayers of copper and vanadium to attach steel and TiAl members.

All four of the above examples suffer from the drawbacks of additional steps, additional expense, and reduced dimensional accuracy. In addition, the use of friction welding imposes geometric constraints upon the usually planar jointing surfaces, which precludes the use of certain synergistic additional jointing methods.

It is also known to employ vacuum brazing of the rotor to the shaft, as disclosed in Japanese Patent Disclosure No. 02-133183. However, the direct vacuum brazing method suffers from the drawback that brazing must be performed under a high vacuum, which is time consuming and expensive. In addition, achieving a reliable joint by this method may be problematic.

A further disadvantage, disclosed in U.S. Pat. No. 6,007,301 to Noda et al., of the above vacuum brazing method disclosed in Japanese Patent Disclosure No. 02-133183 is that with a planar jointing surface accurate alignment of the rotational axes of the shaft and rotor or wheel is difficult, requiring additional machining to restore balance. To minimize this problem, Noda et al. disclose a matching projection and recess to improve alignment of the rotor and shaft, wherein the projection may be either on the shaft or rotor. In either configuration, the surfaces of the projection and recess are not brazed; the brazed portion is concentrically arranged on a planar surface disposed around the projection, and the strength of the joint depends entirely upon this brazed portion because the braze alloy is exposed to maximum loading. Further, the alloy is brittle and prone to fracture from minor shock loads during manufacture.

U.S. Pat. No. 5,174,733 to Yoshikawa et al. discloses jointing an axial projection in a ceramic wheel to an axial recess in a steel shaft by heat shrinkage. This method exploits the low thermal expansivity of ceramics compared to steels. However, this method suffers from the drawback that a change in rotational balance of the rotor shaft assembly commonly occurs due to microscopic relative motion of the rotor and shaft upon repeated cycles of heating and cooling, which produces thermal gradients, in a process known in the art as thermal ratcheting. In addition, as disclosed in U.S. Pat. No. 5,174,733, forces operating at the shaft bearing assembly may weaken the heat shrink joint, requiring elaborate constraints in the bearing assembly design.

U.S. Pat. No. 5,129,784 also to Yoshikawa et al., teaches jointing of a ceramic rotor and a metal shaft by heat shrinkage, in which the joint has improved strength and stability due to the use of a design formula relating the minimum thickness of the shaft recess to the outer diameter of the protruded portion of the ceramic rotor attached therein. Brazing is taught as an alternative to heat shrinkage, but is discouraged as requiring expensive prior plating and subsequent removal of excess plating of the protruded portion of the ceramic wheel (col. 1, lines 44 -54).

In view of the limitations and shortcomings of the methods of the prior art, there is a need for a method to join a TiAl rotor to a shaft made of structural steel or other material for the economical manufacture of a rotor shaft assembly. The bond between the rotor and shaft must be sufficiently strong to: withstand high fluctuating torques and temperatures, maintain rotational balance through an extended life comprising repeated thermal cycling, and is preferably formed by a method requiring the minimum of steps and expense. The present invention provides these advantages and more, as will become apparent to one of ordinary skill upon reading the following disclosure and figures.

SUMMARY OF THE INVENTION

A basic object of the invention is to overcome the aforementioned disadvantages of the prior art and provide a rotor shaft assembly comprising a strong and stable joint between a TiAl turbine rotor and a metal shaft, whereby an intimate positive union of the rotor and shaft is produced that is capable of withstanding the high and fluctuating temperatures found in an operating turbocharger and of withstanding the centrifugal forces encountered in the joining area, and which is suitable for transmitting a relatively high shaft torque.

Another object of the invention is to provide a rotor shaft assembly that avoids the strength limitations of a merely brazed joint, and also avoid the thermal ratcheting and imbalance found with only an interference joint. This object is achieved by a synergistic combination of brazing to support an interference fit. By this synergistic combination, an interference mounting of a TiAl wheel to a metal shaft supported by a braze mounting of the same, produces an unexpectedly strong joint that resists thermal ratcheting and imbalance.

Another object is to increase the effective surface area of a brazed joint between a TiAl rotor and a metal shaft by providing braze channels upon the jointed surface of the rotor, shaft, or both, in order to permit flow of molten braze across the surface of an interference fit, whereby an unexpectedly strong synergistic joint is formed. It is believed that the reduced contact area increases load intensity at contact points and enhances diffusion bonding.

Another object of the invention is to provide a method for the production of a rotor shaft assembly having a strong and stable joint between a TiAl turbine rotor and a metal shaft that is inexpensive, comprises few steps, and which is capable reproducibly producing rotor shaft assemblies requiring a minimum of post-production machining to balance the rotor shaft assembly.

In another object of the invention, the shaft is adapted to receive an axial protruded portion of a rotor within an axial recess disposed within one end of a shaft, and one or more substantially enclosed axial air pockets are provided between the shaft and the rotor in the jointed position. The one or more axial pockets advantageously minimize heat transfer from the rotor to the shaft during operation of the turbocharger.

Another object of the invention is to provide a turbocharger that comprises the improved rotor shaft of the present invention.

Thus, in a first aspect, the present invention provides a titanium aluminide (TiAl) rotor shaft assembly of a type used in a turbocharger, which has a TiAl rotor comprising an axially protruded portion that is fixedly joined to a recessed portion of a metal shaft by the synergistic combination of an interference fit, such as a heat shrinkage fit, further supported by a brazed joint in which a brazing material is interposed between the surface of the protruded portion and the recessed surface.

In a second aspect, the invention provides a method for joining a titanium aluminide rotor comprising an axial protruded portion and a metal shaft comprising a recessed axial portion adapted to accept said protruded portion, to produce a rotor shaft assembly, the method comprising mounting the axial protruded portion to the recessed axial portion to form an interference fit with a braze disposed the portions, and heating the braze to a brazing temperature.

Special features of the invention can be taken from the dependent claims and from the following description with reference to the examples.

BRIEF DESCRIPTION OF THE DRAWINGS

A more complete appreciation of the invention and many of its advantages will be readily understood by referring to the following detailed description considered together with the accompanying drawings in which.

DETAILED DESCRIPTION OF THE INVENTION

Figure 1:
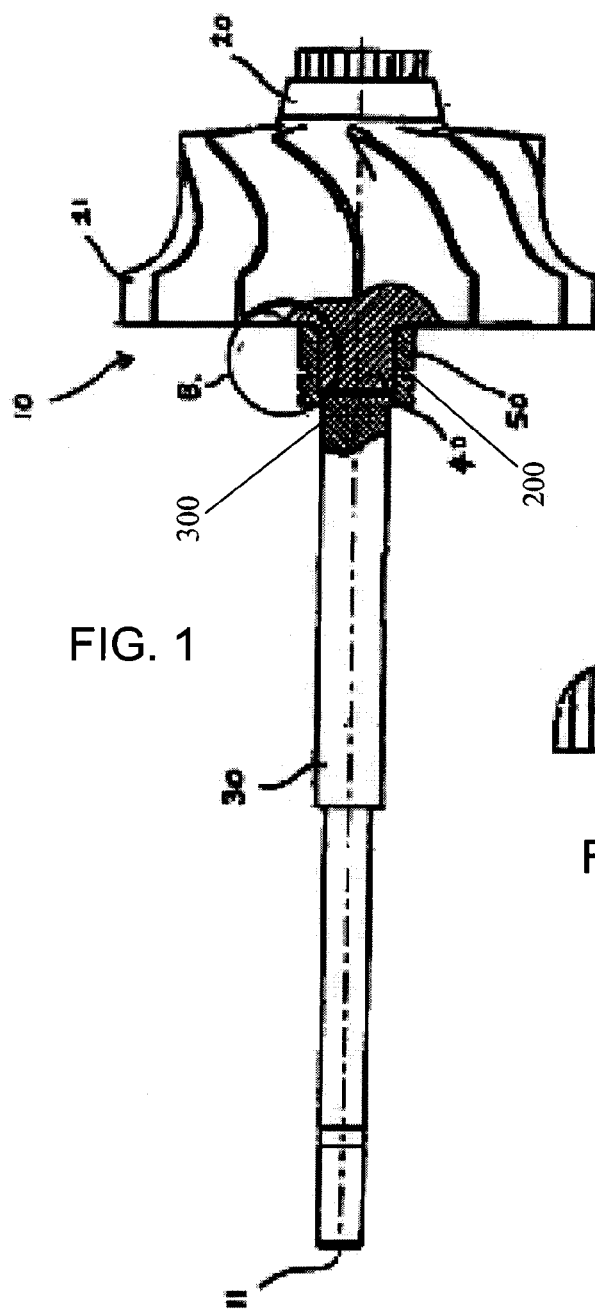
FIG. 1 shows a diagrammatic cross-section of the rotor shaft assembly of an embodiment of the invention.
Figure 3:
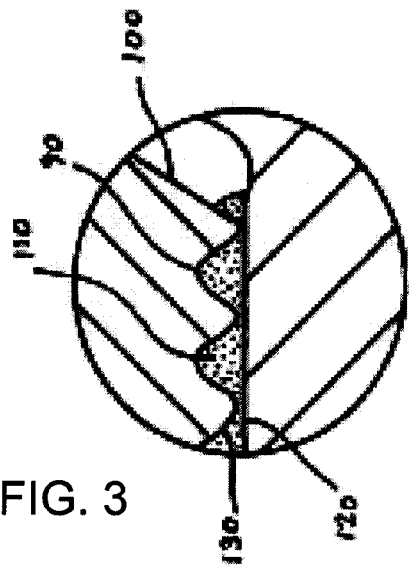
FIG. 3 shows a still further expanded cross-sectional view of the jointing surface.

The rotor shaft assembly according to the present invention is shown in one embodiment in FIG. 1 and comprises a TiAl turbine rotor or wheel made, for example, by a precision casting technique, and a metal rotatable shaft, preferably of a structural steel such as 4140, joined thereto.

Although single phases of the specific chemical compounds TiAl ("TiAl" is specifically used in this instance in the sense of a chemical formula, as distinct from the use of the term herein elsewhere to denote titanium alloys comprising a TiAl intermetallic compound) and $Ti_3Al$ are brittle and weak, two-phase intermetallic TiAl is formed when aluminum comprises about 31-35% of the material by weight and Ti comprises substantially all of the remaining mass. The two-phase TiAl exhibits good ductility and strength, particularly at elevated temperatures.

Other metals are advantageously included in the TiAl of the rotor of the present invention. Minor amounts of Cr, Mn, and V improve ductility, within the range of about 0.2% to about 4%. At amounts greater than about 4%, oxidation resistance and high temperature strength may be compromised. Ni, Ta, and W typically improve the oxidation resistance of TiAl. Si, in amounts between about 0.01% to about 1% improves creep and oxidation resistance. Suitable TiAl materials for use in the present invention include, but are not limited to, those disclosed in U.S. Pat. Nos. 5,064,112 and 5,296,055, U.S. Publication No. 2001/0022946 A1, and U.S. Pat. No. 6,145,414.

Nothing herein should be construed to limit the rotor or shaft of the rotor shaft assembly of the present invention to rotors or shafts having a homogenous metal composition. Bi-metallic metal injection molding is known (e.g. U.S. Patent Application Publication No. U.S. 2003/0012677 A1) whereby different metallic powder compositions admixed to binders are positioned in different portions of the mold to produce articles having a heterogenous distribution of different metals. Such methods are fully adaptable to the method and assembly of the present invention.

The metal of the shaft is not particularly limited except to have tensile strength and corrosion resistance commensurate with providing long service within a turbocharger. Stainless steel alloys, comprising iron and at least one other component to impart corrosion resistant, are preferred. Alloying metals can include at least one of chromium, nickel, silicon, and molybdenum. Suitable steels include precipitation hardened stainless steels such as 17-4 PH stainless steel, which is an alloy of iron, 17% chromium, 4% nickel, 4% copper, and 0.3% niobium and tantalum, which has been subjected to precipitation hardening. Low carbon steels, such as 316 L, are preferred. 4140 is preferred as the shaft material and is an oil-hardening steel of relatively high hardenability. Its chromium content provides good hardness penetration, and the molybdenum imparts uniformity of hardness and high strength, and the ability to resist stress at elevated temperatures.

Referring now to FIG. 1, rotor shaft assembly 10 comprises rotor 20, which comprises a plurality of vanes 21 and is disposed about a common axis of rotation 11 of the rotor shaft assembly. The rotor has an axially protruding portion 40 that is disposed along the rotational axis 11. Preferably, this protruding portion is essentially cylindrical with an essentially constant cross-section for at least a part of the protruding portion. However, the protruding portion may have a cross-section other than circular provided that a suitable interference fit with the shaft 30 can be obtained. The shaft is adapted at the end engaging the protruded end of the rotor with a complementary recessed axial portion 50. The axially protruding portion 40 has a wall 200 and a distal end 300.

A suitable interference fit may be obtained by any method known in the art. In a preferred embodiment, a shrink fit method is used to mount the rotor to the shaft. For example, the inner diameter of the recessed axial portion of the shaft is chosen with reference to the outer diameter of the axial protruded portion of the rotor so that the shaft and rotor are mountable when the shaft is heated to a sufficient temperature. Upon cooling, the shaft exerts a compressive stress upon the rotor. The dimensions of the rotor and shaft are chosen so that the interference fit provides tensile stress close to or at the yield strength of the shaft material. A further consideration in determining appropriate dimensions is that, during assembly, a braze material is interposed at the jointing surfaces. Exemplary dimensions are provided below ("EXAMPLES").

To ensure that the jointing surface is wetted by the braze alloy at brazing temperatures, the axial protruded portion, the recessed axial portion, or both, are preferably provided with surface braze channels having dimensions chosen to permit the flow of molten braze at the jointing surface. For example, the recessed axial portion of the shaft is machined to include shallow helical grooves of both left- and right-handed helical senses, whereby the overlapping groove provide a cross-hatched effect of interconnected braze channels. As a second example, the recessed axial portion is knurled, whereby shallow grooves oriented parallel to the axis of rotation are provided.

The braze material is not particularly limited. However, a braze that actively bonds to both surfaces with a minimal amount of diffusion, such as Cusil ABA, is preferred. Brazing methods include vacuum brazing and induction brazing methods. Vacuum brazing is preferred. Typically, brazing is performed for 15 mins at 1500° F. under vacuum. Preferably, the length of brazing is controlled to minimize diffusion.

According to the method of the present invention, the rotor shaft assembly is prepared by mouting the axial protruded portion of the rotor into said recessed axial portion to form an interference fit with a braze disposed therebetween. Where a shrink fit process is used, the brazing step may occur concurrently with, or after, the pressing step. A shrink-fit, rather than a press-fit, is preferred to minimize risk of damage to wheel material. For example, assembly is performed with the shaft at 700° F. and the wheel at ambient temperature.

Figure 2:
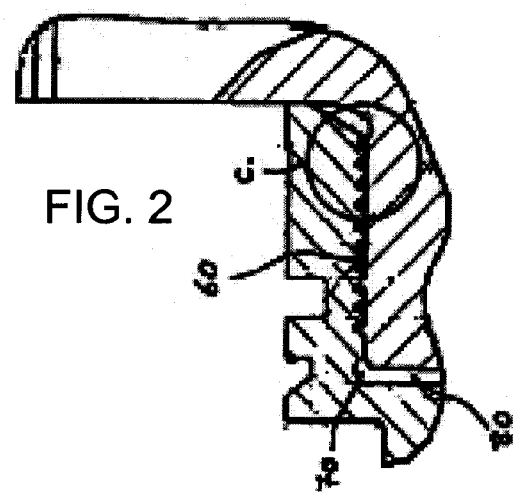
FIG. 2 shows an expanded cross-sectional view of the jointing surface.

Referring now to FIG. 2, there is shown an expanded cross-sectional view of a jointing surface. The recessed axial portion optionally comprises an undercut 70 at its distal end in order to lessen the accumulation of stresses at the end of the recess. An optional cambered opening 100 to the recessed portion is provided to facilitate assembly.

The joint 60 is shown in greater detail in FIG. 6, wherein the braze 110 is disposed between the jointing surface of the axial protruded portion 120 and the jointing surface of the recessed axial portion 130. Also shown is a braze channel 90 in the form of a spiral groove.

Optionally, one or more cavities 80 are provided disposed at the distal end of the recessed portion. The cavity or cavities advantageously minimize heat transfer from the rotor, which is exposed to hot exhaust gases, to the shaft and its bearing.

EXAMPLES

In these examples, rotor shaft assemblies are produced from a 4140 steel shaft and a TiAl rotor using a Cusil ABA braze and a moderate pressing force. The inner diameter of the shaft at the joint (D) and the length of the protruded portion of the rotor (X) were chosen as follows:

|           | D (inches) | X (inches) |
|-----------|------------|------------|
| Example 1 | 0.455      | 0.435      |
| Example 2 | 0.525      | 0.435      |
| Example 3 | 0.654      | 0.571      |

At a testing temperature of 1100 F. (75% of the brazing temperature), the strength of the joint is more than three times higher than the strength obtained with heat-shrink alone in the absence of braze.

Various modifications and changes may be made by those having ordinary skill in the art without departing from the spirit and scope of this invention. Therefore, it is to be understood that the illustrated embodiments of the present invention have been set forth only for the purposes of example, and that they should not be taken as limiting the invention as defined in the following claims.

The words used in this specification to describe the present invention are to be understood not only in the sense of their commonly defined meanings, but to include by special definition, structure, material, or acts beyond the scope of the commonly defined meanings. The definitions of the words or elements of the following claims are, therefore, defined in this specification to include not only the combination of elements that are literally set forth, but all equivalent structure material, or acts for performing substantially the same function in substantially the same way to obtain substantially the same result.

In addition to the equivalents of the claimed elements, obvious substitutions now or later known to one of ordinary skill in the art are defined to be within the scope of the defined elements.

The claims are thus to be understood to include what is specifically illustrated and described above, what is conceptually equivalent, what can be obviously substituted and also what incorporates the essential idea of the invention.

LISTING OF THE PARTS 10 rotor shaft assembly
11 axis of rotation
20 rotor
21 rotor vanes
30 shaft
40 axial protruded portion
50 recessed axial portion
60 joint
70 undercut
80 cavity
90 braze channel
100 cambered opening
110 braze
120 jointing surface of axial protruded portion
130 jointing surface of recessed axial portion
Now that the invention has been described,

What is claimed is:

1. A rotor shaft assembly (10) comprising:
a titanium aluminide rotor (20) comprising an axial protruded portion (40) having a wall (200) and a distal end (300); and a metal shaft (30) comprising a recessed axial portion (50) adapted to accept said protruded portion (40), wherein said protruded portion (40) and said recessed portion (50) are joined by a brazed joint (60) and an interference fit, wherein the brazed joint (60) is between the wall (200) and the recessed axial portion (50), wherein a braze channel (90) is formed by cross-hatching at least one of the wall (200) of the protruded portion (40) or the recessed portion (50), and wherein the cross-hatching comprises at least one helical channel.

2. The rotor shaft assembly (10) of claim 1, wherein the wall (200) of the protruded portion (40) and the recessed portion (50) further comprise the braze channels (90).

3. The rotor shaft assembly (10) of claim 1, wherein said cross-hatching comprises a left-handed helical channel and a right-handed helical channel.

4. The rotor shaft assembly (10) of claim 1, wherein said brazed joint (60) is formed by vacuum brazing or induction brazing.

5. The rotor shaft assembly (10) of claim 1, wherein said shaft (30) is a steel shaft.

6. A method for joining a titanium aluminide rotor (20) comprising an axial protruded portion (40) and a metal shaft (30) comprising a recessed axial portion (50) adapted to accept said protruded portion (40), to produce a rotor shaft assembly (10), the method comprising:
   (a) mounting said axial protruded portion (40) to said recessed axial portion (50) to form an interference fit with a braze (110) disposed therebetween;
   (b) heating the braze (110) to a brazing temperature; and
   (c) flowing molten braze along braze channels (90) upon a surface of at least one of the axial protruded portion and the recessed axial portion, whereby said rotor shaft assembly (10) is produced, wherein the braze channel (90) is formed by cross-hatching at least one of a wall (200) of the protruded portion (40) or the recessed portion (50), and wherein the cross-hatching comprises at least one helical channel.

7. The method of claim 6, wherein said recessed axial portion (50) is at a higher temperature than said protruded portion (40) during pressing, whereby said interference fit is a shrinkage fit.

8. The method of claim 6, wherein said cross-hatching comprises a left-handed helical channel and a right-handed helical channel.

9. The method of claim 6, wherein said braze (110) is formed by vacuum brazing or induction brazing.

10. The method of claim 6, wherein said shaft (30) is a steel shaft.

11. A turbocharger comprising:
a rotor (20) having an axial protruded portion (40) with a wall (200) and a distal end (300); and
a shaft (30) having a recessed axial portion (50) adapted to accept said protruded portion (40), wherein said axial protruded portion (40) and said recessed axial portion (50) are joined by a brazed joint (60) and an interference fit, and wherein the brazed joint (60) is between the wall (200) and the recessed axial portion (50), wherein a braze channel (90) is formed by cross-hatching at least one of the wall (200) of the protruded portion (40) or the recessed portion (50), and wherein the cross-hatching comprises at least one helical channel.

12. The turbocharger of claim 11, wherein the axial protruded portion (40) is cylindrical.

13. The turbocharger of claim 11, wherein a cavity (80) is defined between the distal end (300) of the axial protruded portion (40) and the recessed axial portion (50), and wherein the brazed joint (60) is only between the wall (200) and the recessed axial portion (50).

14. The turbocharger of claim 11, wherein said cross-hatching comprises a left-handed helical channel and a right-handed helical channel.

15. The turbocharger of claim 11, wherein said recessed axial portion has an undercut (70).

* * * * *